Dec. 18, 1934.  H. R. LYTLE  1,984,648
EARTH MOVER
Filed Jan. 9, 1933  2 Sheets-Sheet 2
FIG_3_
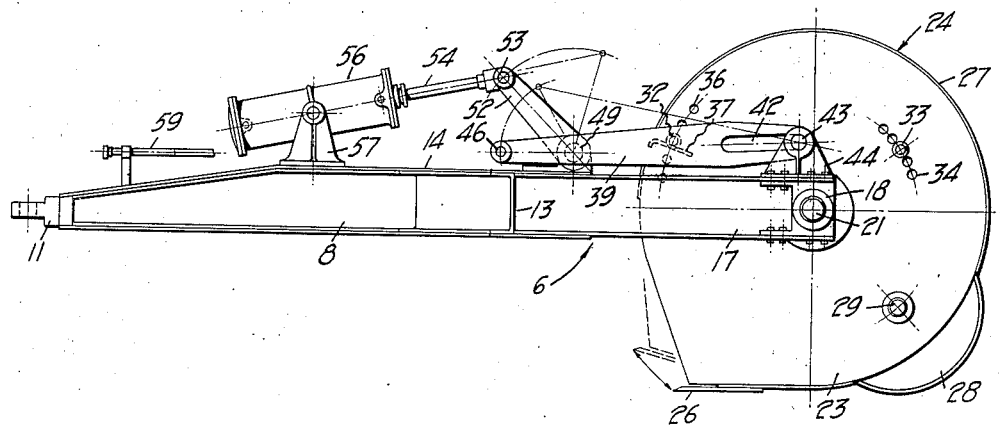
FIG_4_
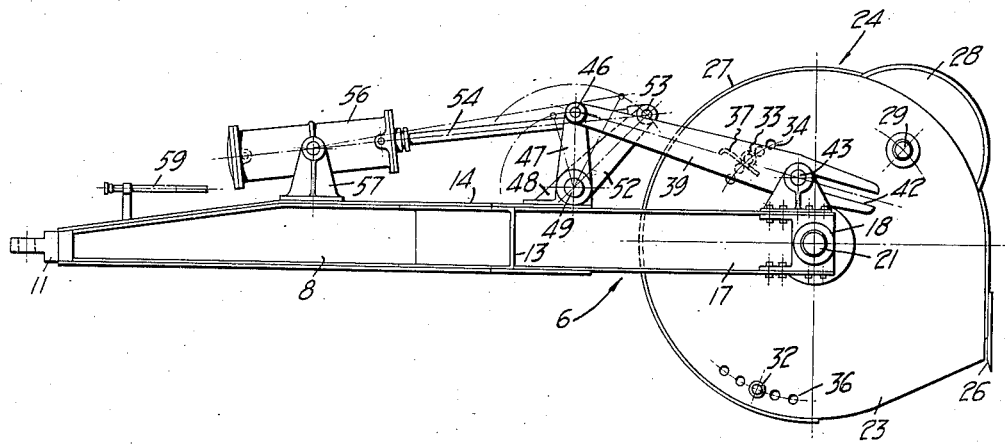
INVENTOR.
Harry R. Lytle
BY
White, Prost, Flehr & Lothrop
ATTORNEYS.

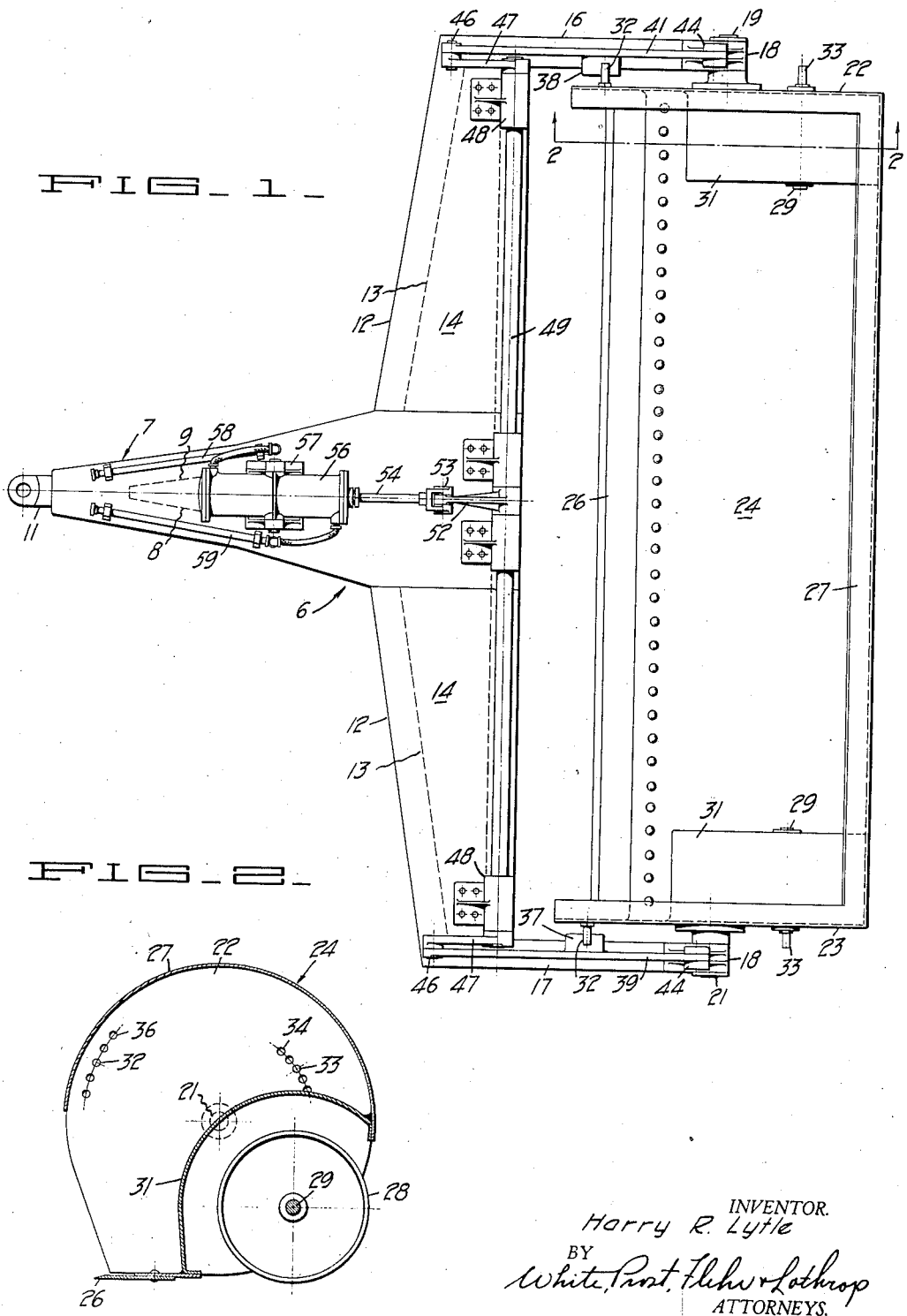

Patented Dec. 18, 1934

1,984,648

UNITED STATES PATENT OFFICE 1,984,648

EARTH MOVER

Harry R. Lytle, Sacramento, Calif., assignor to Knapp Manufacturing Corporation, Oakland, Calif., a corporation of California Application January 9, 1933, Serial No. 650,778

8 Claims. (Cl. 37—140)

My invention relates to earth movers primarily of the type having a rotating earth-receiving scoop which is designed in one position to act as an excavator and in another position to discharge the previously received earth in a more or less uniform layer.

An object of my invention is to provide an earth mover in which the scoop can be selectively positioned in any one of a plurality of different positions.

Another object of my invention is to provide an earth mover in which the control of the scoop is centralized in a single actuator, in order to simplify the control.

A further object of my invention is to provide an earth mover which is simply controlled and which is adjustable for various different operating conditions.

An additional object of my invention is to provide an earth mover of the type mentioned in which the scoop is positioned by a power actuator.

The foregoing and other objects are attained in the embodiment of the invention shown in the drawings, in which—

Figure 1 is a plan of an earth mover constructed in accordance with my invention.

Figure 2 is a cross-section the plane of which is indicated by the line 2—2 of Figure 1.

Figure 3 is a side elevation of an earth mover constructed in accordance with my invention.

Figure 4 is a side elevation of my earth mover, with the scoop in a different position from that shown in Figure 3.

In its preferred form, the earth mover of my invention comprises a draft frame on which a scoop is rotatably mounted and includes a power actuated means for selectively positioning the scoop in any one of a plurality of predetermined positions.

In the form of my earth mover shown in the accompanying drawings, I preferably provide a draft frame, generally designated 6, which includes a draft tongue 7 made up of suitable channel members 8 and plates 9 and terminating in a draft hitch 11 designed to be fastened to the drawbar of a tractor or other suitable propelling machine. Also included in the draft frame is a transverse beam 12 made up of channels 13 and plates 14 which spans a pair of side arms 16 and 17 respectively, each terminating in a journal 18.

Rotatably mounted in the journals are stub-shafts 19 and 21 respectively, disposed in axial alignment and connected to end plates 22 and 23 of a scoop 24. The scoop includes a cutting edge 26 for engagement with the ground, and a back plate 27 formed to generally circular cylindrical contour. Adjacent each of the end plates 22 and 23 I preferably mount a ground-engaging wheel 28 which is carried on a suitable axle 29 and is housed in a casing 31 projecting into the scoop proper. If unrestrained, the scoop 24 will rotate during the advancement of the draft frame over the ground, and in accordance with my invention I provide means for restraining the rotary movement of the scoop except under certain conditions. To this end I preferably provide on each of the end plates 22 and 23 a plurality of stops such as 32 and 33. As particularly shown in Figures 3 and 4, these stops are spaced apart polarly of the end plates and are likewise spaced apart radially. The stops are preferably removable pins which extend axially of the end plates and are received in any one of a plurality of apertures 34 and 36 for varying adjustment of the mechanism.

Adapted to engage the stops are inter-engaging plates 37 and 38 respectively, which are mounted on members 39 and 41 respectively. The members 39 and 41 are designed to be moved with a motion having a radial component in order to engage selectively either the stops 33 or the stops 32.

For this purpose the members 39 and 41 are at one end bifurcated, as indicated at 42, and each overlies an associated pin 43 carried in a bracket 44 on the members 16 and 17. The opposite end of each of the members 39 and 41 is fastened by a pivot pin 46 to a crank 47. Journaled on the draft frame by means of bearings 48 is a cross shaft 49 the opposite ends of which support the cranks 47.

In order to rotate the cross shaft 49 and impart movement to the members 39 and 41, I preferably situate a crank arm 52 on the cross shaft and connect the crank arm by a pivot 53 to the piston rod 54 of a hydraulic cylinder mechanism 56. A bifurcated bracket 57 mounted on the tongue 7 provides a trunnion mounting for the oscillating cylinder 56, while hydraulic lines 58 and 59, respectively, lead to a suitable pump and controlling valve, not shown but constructed in accordance with usual practice.

In the operation of the device, during the forward movement of the earth mover the hydraulic cylinder 56 can be actuated so that the plates 37 and 38 inter-engage the pins 32, for instance. In this event the scoop 24 is maintained in the position indicated in Figure 3, with the blade 26 in engagement with the ground and with the weight of the scoop for the most part carried upon the ground-engaging wheels 28. Since preferably the plates 37 are situated at an inclination to the body of the members 39 and 41, a slight movement of the piston rod 54 causes an adjustment of the cutting blade 26, as indicated by the dotted lines in Figure 3. When the scoop 24 is filled, or it is desired to alter its position, the piston 54 is operated to move the plates 37 and 38 radially inward or rearwardly, as seen in Figure 3, and thereby release the pins 32. The scoop 24 then rotates until the pins 33 contact the plates 37 and 38, as indicated in Figure 4, in which position the scoop discharges its contents. A slight movement of the piston rod 54, due to the inclination of the plates 37 and 38, again produces a slight adjustment of the scoop so that the blade 26 can act as a drag in spreading the discharged material over the ground to varying depths.

When further it is desired to position the scoop in a different predetermined location, the cylinder 56 is so operated through the control lines 58 and 59 that the piston rod 54 is retracted substantially to a position as indicated in Figure 3. Such movement causes the plates 37 and 38 to release the pins or stops 33 and permit the scoop again to rotate substantially into the position indicated in Figure 3.

In accordance with my invention, therefore, I have provided an earth mover in which but a single controller is effective not only to adjust the cutting blade of the scoop but also selectively to position the scoop in any one of a plurality of predetermined positions. Such positioning of the scoop can further be adjusted by moving the stops 32 and 33 into selected ones of the apertures 36 and 34 respectively, so that a very flexible and versatile implement is provided with an exceedingly simple control.

I claim:

1. An earth mover comprising a draft frame, a scoop mounted for rotation on said frame, a plurality of stops on said scoop spaced at different distances from the center thereof, and a member on said frame movable with a radial component selectively to engage said stops.

2. An earth mover comprising a draft frame, a scoop mounted for rotation on said frame, a pair of stops on said scoop spaced at different distances from the center thereof, and a member on said frame movable into one position to engage one of said stops and movable into another position to engage the other of said stops.

3. An earth mover comprising a draft frame, a scoop mounted for rotation on said frame, a pair of stops on said scoop spaced at different distances from the center thereof, and a member on said frame movable toward and away from said center to engage either of said stops.

4. An earth mover comprising a draft frame, a scoop having a pair of end plates mounted for rotation on said frame, a pair of stops on each of said end plates spaced different distances from the center thereof, a pair of members on said frame movable toward and away from said center for selectively engaging said stops, a cross shaft on said frame for actuating said members, and means on said frame for operating said shaft.

5. An earth mover comprising a draft frame, a scoop having a pair of end plates mounted for rotation on said frame, a pair of stops radially and polarly spaced on each of said end plates, a pair of members on said frame for selectively engaging either of said stops on each end plate, and means on said frame for simultaneously operating said members.

6. An earth mover comprising a draft frame, a scoop mounted for rotation on said draft frame about a transverse axis, a plurality of axially projecting stops on said scoop spaced different distances from said axis, a member on said frame movable toward and away from said axis for engaging said stops selectively, a cross shaft on said frame, a crank on said cross shaft pivoted to said member, a crank arm on said cross shaft, and a hydraulic mechanism on said frame for operating said crank arm.

7. An earth mover comprising a draft frame, a scoop, end plates on said scoop and rotatably mounted on said draft frame, a pair of stops projecting axially from each of said end plates, said stops being spaced angularly apart and at different distances from the center of said plates, a pair of members on said frame each adapted by movement toward and away from said center selectively to engage the stops of said pairs, a cross shaft on said frame, a pair of cranks on said shaft each pivoted to one of said members, a crank arm on said cross shaft, a hydraulic cylinder pivotally mounted on said frame, and a piston in said cylinder pivotally connected to said crank arm.

8. An earth mover comprising a draft frame, a scoop, end plates on said scoop mounted on said draft frame for rotation about a transverse axis, a pair of stops on each of said end plates, said stops being spaced at different distances from said axis, and a pair of members slidably movable on said draft frame toward and away from said axis for alternative engagement with said stops.

HARRY R. LYTLE.